Nov. 2, 1954  W. F. R. BRISCOE ET AL  2,693,005
PNEUMATIC TIRE MOLD
Filed April 19, 1950
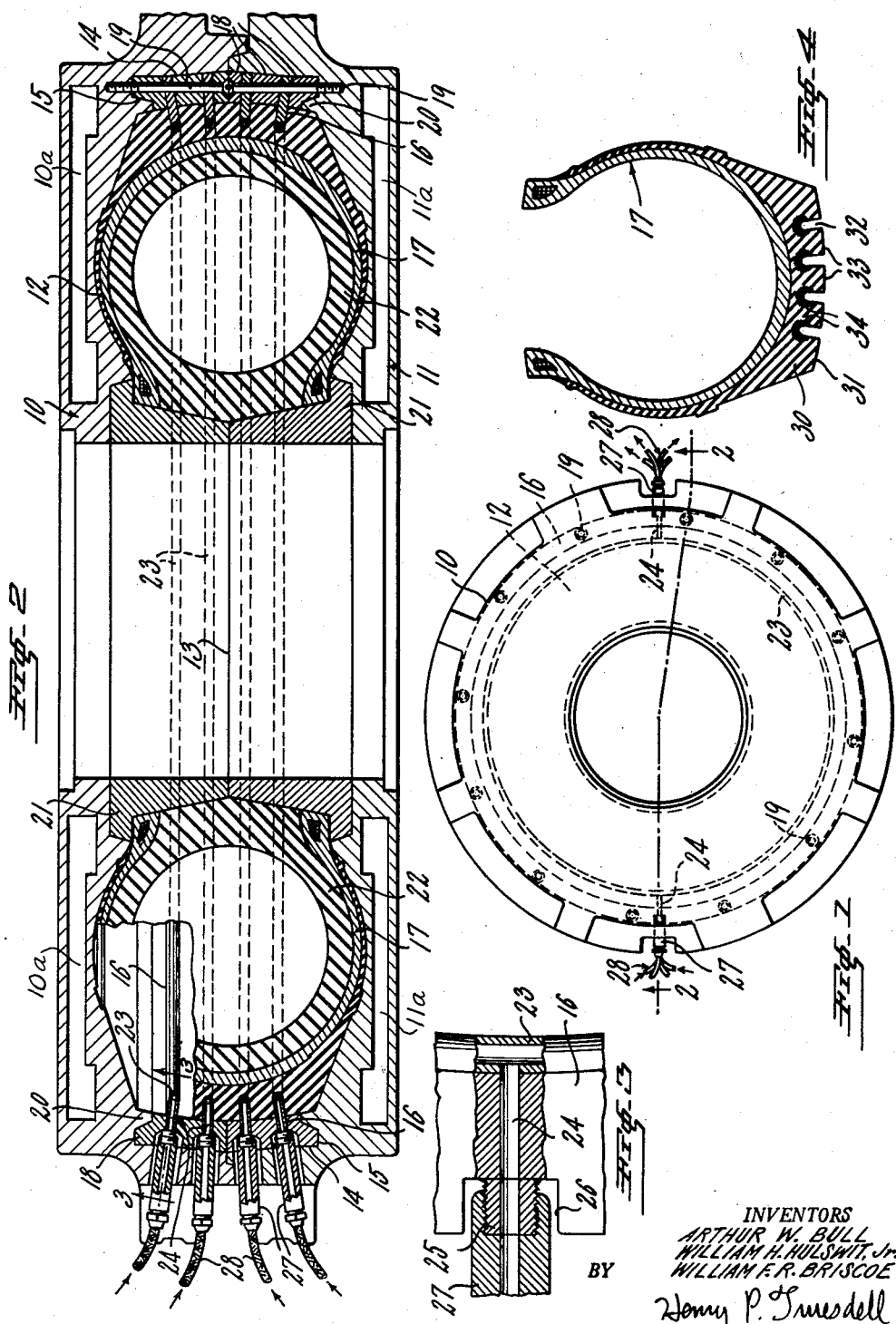
INVENTORS
ARTHUR W. BULL
WILLIAM H. HULSWIT, Jr.
WILLIAM F. R. BRISCOE
BY Henry P. Truesdell
ATTORNEY

United States Patent Office 2,693,005
Patented Nov. 2, 1954

2,693,005

PNEUMATIC TIRE MOLD

William F. R. Briscoe, Detroit, and Arthur W. Bull and William H. Hulswit, Jr., Grosse Pointe, Mich., assignors to United States Rubber Company, New York, N. Y., a corporation of New Jersey Application April 19, 1950, Serial No. 156,842

5 Claims. (Cl. 18—38)

This invention relates to an improved pneumatic tire mold. More particularly it relates to a pneumatic tire mold in which means are provided for limiting the relative degree of vulcanization of the tire in the area of the bases of the tire tread grooves, so that the groove surfaces of the vulcanized tire are less susceptible to cracking.

The method disclosed herein for making a pneumatic tire, and the improved tire itself, are claimed in an application of W. H. Hulswit et al., Serial No. 156,841, filed of even date herewith and assigned to the same assignee as the present application.

In the past it has been a common failing of pneumatic tires that the bases of the grooves defining the anti-skid pattern of the tire tread tend to develop cracks. This groove-cracking is occasioned largely by the fact that the rubber of the groove bases is under tension when the tire is inflated, rendering the rubber particularly susceptible to attack by ozone in the air with consequent deterioration of the rubber composition. This type of deterioration is evidenced by cracking of the rubber surface. Continual flexing of the groove bases as the tire revolves aggravates this condition by causing the surface cracks to grow, or become enlarged. Such cracking is not only unsightly, but actually weakens the structure of the tire and may be a cause of premature failure of the tire.

It has been found that the tendency to groove cracking is greatly reduced if the tire is vulcanized in such a way as to leave the rubber composition in the area of the bases of the grooves partially unvulcanized, the remainder of the rubber composition of the tread being vulcanized to the normal extent, so that tread wear and tire strength are in no way sacrificed. The partially unvulcanized rubber composition at the bases of the grooves has been found to be far more resistant to the influences causing groove cracking than ordinary fully vulcanized rubber tread compositions, with the result that the tire gives more satisfactory performance in this respect.

A principal object of the invention is to provide an improved tire mold for vulcanizing a tire in such manner that the groove bases are less susceptible to cracking.

Another object is the provision of a tire mold in which the relative degree of vulcanization of the tire in the area of the groove bases is readily controllable.

A further aim is to provide a mold for equipping old or worn tires with a new tread surface embodying improved resistance to tread groove cracking.

Other objects and advantages will appear in the following detailed description, when read with reference to the accompanying drawing in which:

Fig. 1 is a plan view of a tire vulcanizing mold of this invention;

Fig. 2 is a sectional view on a larger scale of the mold of Fig. 1 taken along the lines 2—2 of Fig. 1, and showing a pneumatic tire containing a curing bag in place in the mold, a portion of the tire and curing bag being broken away;

Fig. 3 is an enlarged sectional view of a part of the mold taken along line 3—3 of Fig. 2; and Fig. 4 is a sectional view of a tire produced in the mold.

Referring to Figs. 1 and 2, the tire shaping and vulcanizing mold shown therein comprises an annular upper mold half 10 and an annular lower mold half 11 which together define a toroidal cavity 12 for the tire. The mold is split at a horizontal parting line 13 and may be opened for insertion and removal of the tire. The mold is adapted to be disposed within the usual enclosing chamber or press (not shown) such as a McNeil press, which is adapted to clamp the mold halves 10 and 11 firmly together during vulcanization. Suitable means, such as steam jackets, are associated with such chamber or press for heating the mold from the outside, or the mold halves 10 and 11 may themselves contain suitable passageways 10a and 11a in the walls thereof for circulating a fluid heating medium supplied to the passageways from a suitable source (not shown) in a manner well understood in the art.

Each mold half is provided with an annular tread block assembly 14 located at the outer periphery of the mold cavity 12. The tread block assembly 14 is disposed within a suitable shaped recess 15 in the mold half. The tread block assembly 14 includes projecting members or ribs 16 which extend into the mold cavity 12 for the purpose of impressing a suitable anti-skid pattern on the tread surface of a tire 17 in the mold cavity. Although the ribs 16 are in this case shown as straight circumferential ribs, it will be understood that projections or ribs of other suitable shapes and arrangement may be employed for the purpose of impressing the particular groove pattern desired on the tread surface of the tire 17.

The tread block assembly 14 further includes suitably shaped spacer ring members 18 interposed with the ribs 16, the whole assembly being held firmly together by spaced screws 19 passing into the parting faces 13 through transverse holes in the ribs and spacer rings, and threaded into the mold halves. An annular rim or flange 20 of the mold half intermeshes with a corresponding recess in the end of the tread block assembly 14 and aids in maintaining it securely in place.

The spacer ring members 18 are preferably made of a material of relatively high heat conductivity, such as aluminum, to facilitate transfer of the greatest possible amount of heat from the mold to the tread portion of the tire, which portion, being relatively thick and heavy, requires proportionately greater heating in order to become uniformly vulcanized.

Each mold half is also provided at its inner diameter with a toe ring member 21 which may be welded or otherwise attached to the mold half, and which is adapted to impart the desired shape to the bead region of the tire 17 in cooperation with a curing bag 22, which is an inflatable toroidal form of extensible material, somewhat similar to an inner tube, and which is inserted in the tire before it is placed in the mold cavity. The curing bag 22 is provided with the usual inlet and outlet means (not shown) for circulation of a heated fluid medium under pressure through the hollow interior thereof for the purpose of expanding the tire 17 to cause it to conform to the shape of the mold, as well as for the purpose of supplying internal heat to the tire, whereby it may be vulcanized more rapidly and more uniformly.

The end surface of each projecting tread rib 16 of the mold is provided with a tube 23 for circulation of a fluid heat-controlling medium for limiting the degree of vulcanization of the tread rubber composition in the area of the tread groove bases. The tubes 23 pass around the entire circumference of the ribs 16 and may be attached thereto by brazing or other suitable means. Connecting holes 24 are drilled radially of the mold through the ribs 16 into the encircling tubes 23 at diametrically opposed points, to provide for entrance and egress of the heat controlling fluid. As shown in Fig. 3, each hole 24 engages a threaded nipple 25 welded to the tread block assembly 14 within a suitable recess 26 provided in the tread block assembly for the purpose of connecting the holes 24 to a suitable coupling assembly 27 from which flexible metal hoses 28 (Figs. 1 and 2) may be extended to a suitable source (not shown) for circulating heating fluid.

In operation of the mold, a raw pneumatic tire 17 to be vulcanized is placed within the mold cavity 12 and the mold is closed as previously indicated. It will be understood that the tire 17 may first be built up in band form on a tire building drum in the conventional manner and subsequently shaped with the aid of a curing bag 22 in the usual vacuum shaping box. All of the foregoing steps are well understood by those skilled in the art, and require no detailed description here. As far as the present invention is concerned, any suitable method may be employed for building and preliminary shaping of the tire. With the tire in place, the mold is then heated to vulcanizing temperatures, both by applying external heat thereto, and by introducing a heated fluid medium under pressure to the interior of the curing bag 22.

In conventional practice, every effort is made to so design the heat transfer characteristics of the mold, and to so proportion the relative temperatures applied to the mold externally and internally, that the entire tire will be uniformly vulcanized to the optimum extent. Thus, it is important that no part of the tire be subjected to an excessive temperature, or be heated for too long a period, otherwise that portion might become over-cured and therefore have substandard physical and wearing properties. Similarly, it has heretofore been considered essential to insure that all parts of the raw tire be heated to a sufficiently high temperature for a sufficient length of time to effect a complete cure of the various rubber compositions of the tire, because partial or limited cure has been associated with undesirable physical properties, such as inferior strength and poor abrasion resistance.

In the present mold, the degree of cure of the tire tread composition in the surface of the bases of the tread grooves is deliberately limited by circulating through the tubes 23 on the end of the projections 16 a fluid medium of lower temperature than the general mold temperature, so that the tubes 23, in effect, serve as cooling tubes. The cooling medium is introduced during the vulcanizing operation into hoses 28 at one side of the mold whence it passes through couplings 27 into the radial connecting passageway 24 into the interior of tubes 23, and then passing in either direction circumferentially along the tubes 23 to the diametrically opposed outlet hoses 28 similarly connected at the opposite side of the mold. This lowers the temperature of the tread composition in the area of the groove bases during the vulcanizing operation and thereby limits the degree of vulcanization which takes place, compared to the remaining uncooled portion of the tread.

In general, with the usual vulcanizable tire tread compositions, satisfactory results are obtained when the temperature of the circulating cooling medium within the tubes 23 is approximately 20° F. below the temperature of the heating chamber which supplies external heat to the mold. Such cooling medium may be circulated during all or part of the normal curing cycle.

Upon completion of the normal curing cycle the mold is opened and the vulcanized tire is removed therefrom in the usual manner. As indicated in Fig. 4 the tire so produced has a tread portion 30 composed of a single integral vulcanized rubber composition. This composition may be any of the usual rubber compositions, whether comprised of natural rubber, or synthetic rubber such as GR-S etc., conventionally employed for tire treads. The tread 30 has a road-contacting surface 31 which has imparted thereto an anti-skid pattern defined by circular grooves 32 and projecting anti-skid blocks 33. It will be understood that any other suitable anti-skid pattern may be impressed on the tread as desired by using a correspondingly shaped vulcanizing mold.

Areas 34 at the bases of the groove 32 have purposely been left partially under-cured with the result that this portion of the tread composition has exceptional resistance to cracking, and withstands considerably more flexing than would be the case if it were fully cured. At the same time, the road-contacting surface 31 and the block portions 33 have attained full cure so that these portions have the desired toughness and high abrasion resistance. Such a tire tread composition, although essentially integral, has selective degrees of cure, and therefore selective physical properties, in different parts thereof.

The relative degree of cure of the main body of the tread 30, as compared to the groove bases 34 is readily determinable by measuring any of those physical properties which normally vary with the degree of cure. Thus, for example, if the elongation-at-break is determined on samples of the rubber removed from the tire tread made in the mold of this invention, it is found that the groove base areas display considerably greater elongation-at-break than the road-contacting areas. Usually, satisfactory performance with respect to groove-cracking is obtained when the elongation-at-break of the rubber of the groove bases is from 1.05 to 1.25 times, and preferably about 1.12 times, the elongation-at-break of the rubber in the road-contacting surfaces, the exact value in any given case depending on such variables as the nature of the particular rubber tread composition employed, the service for which the tire is intended, etc.

In any case, the rubber of the groove bases should not be left under-cured to such an extent that they lack strength and have poor appearance, or tend to be tacky and to retain dirt and stones picked up from the road.

The desired relative degree of cure is usually obtainable, as indicated previously, by circulating water or other medium in the groove base tubes at a temperature of approximately 20° F. less than the steam temperature in the chamber enclosing the mold. This is based on results obtained with standard tire tread compostions in a McNeil type mold wherein the steam jacket temperature is usually of the order 250° to 310° F. However, the temperature differential between the heating medium in the groove base tubes and in the remainder of the mold will vary in any given case, depending on such variables as the nature of the tread composition, the design of the mold and the enclosing chamber, the external and internal temperatures applied to the tire, the time cycle of vulcanization, the velocity of the circulating fluid in the groove base tubes, etc. In practice, an average effective temperature differential of from 5° to 40° F. between the groove bases and the temperature of the remainder of the tread will be found to cover the majority of cases, and to result in a tire tread in which the relative degrees of cure of the groove bases and the road contacting portions are as desired.

The following example illustrates the use of the mold in more detail.

A pneumatic tire was built up in the usual manner using a conventional, abrasion-resisting rubber composition of the following character for the tread portion thereof:

|  | Parts by weight |
|---|---|
| Smoked sheet (natural rubber) | 100 |
| Stearic acid | 3 |
| Pine tar | 2 |
| Zinc oxide | 3 |
| MPC black | 43 |
| Sulfur | 3 |
| Mercaptobenzothiozole | 0.6 |
| Phenyl-beta-naphthylamine | 1.0 |

The side wall portions of the tire were composed of a conventional, relatively soft rubber composition, and the carcass of the tire was composed of the usual rubber and cord laminates containing inextensible bead elements in the rim portions.

The raw tire containing a curing bag was placed in a mold as shown in Fig. 2. The external jacket surrounding the mold was heated with steam at 281° F. for about 75 minutes. During this time hot water was circulated through the curing bag at a temperature of 310° F. At the same time hot water at 261° F. was circulated through the groove tubes.

After removal of the tire from the mold the relative degrees of cure of the groove bases and the road contacting surfaces of the tread were determined by removing samples of the rubber and performing various tests thereon, viz., by determining the elongation-at-break, the percentage of free sulfur, the swelling index, and the T-50 value. The relative cure at the groove bases as indicated by the tests was approximately ½ that of the road-contacting surfaces.

Tires made in this manner were placed on a test wheel and run at a speed of 45 miles per hour under conditions simulating heavy loading of the tire for about 179 hours. For comparison, tires made in the conventional manner were similarly tested. During the test, the conventional tire developed extensive cracks in the groove bases, while the tire of this invention, under similar conditions, developed only minor cracks. The relative degree of cracking may be quantitatively expressed as the percentage of cracked area, based on the total under-skid area. The total under-skid area of any groove is represented by the product of the circumferential length of the groove times the depth of the rubber at the base of the groove. The cracked area is the product of the length of the crack times the depth of the crack. Expressed in this way, the percentage cracking of the conventional tire tested above was 41.66%, while the percentage cracking of the tire of this invention was only 0.24%.

While the invention has been described with particular reference to a mold for manufacture of a new tire, it will be understood that old or worn tires may be provided with an improved tread using a mold constructed according to this invention. This may be accomplished by retreading the tire in the usual manner with a strip of vulcanizable rubber tread composition, but using a retreading mold in which groove cooling tubes are employed for applying relatively milder vulcanizing conditions to the groove bases so that the resulting tread has the desired crack-resistant, partially cured areas in the surfaces of the grooves.

From the foregoing, it is seen that the invention provides an economically constructed and conveniently used mold for producing a tire which is less susceptible to groove cracking.

The mold provides for the closest control over the relative state of cure of the groove bases, because a circulating temperature controlling medium of any suitable desired temperature may be applied to the groove areas for any desired part of the curing cycle.

Because the rubber of the groove surfaces is only partially cured, its modulus is relatively low, and therefore the stresses therein resulting from inflation and flexing are relatively low. Hence, the surface is less susceptible to fatigue failure from continually reversing applied stresses.

The under-cured stock in the groove surfaces has much more resistance to ozone than does fully-cured stock, thereby imparting protection from ozone at the very point where ozone attack is normally most damaging.

Having thus described our invention, what we claim and protect by Letters Patent is:

1. A mold for a pneumatic tire having a toroidal cavity for accommodating the tire, said mold having a tread-enclosing area for confining and shaping the tire tread, projecting areas on the said tread enclosing area for impressing a grooved anti-skid pattern on the tire tread, and tubes mounted on the said projecting areas for controlling the degree of cure in the groove bases, said tubes being located toward the inner ends of said projections.

2. A mold for a pneumatic tire including two separable annular mold halves defining a toroidal cavity for the tire, said mold halves having tread blocks for confining and shaping the tire tread, projecting ribs on said tread blocks for imparting a grooved anti-skid pattern to the tire tread, means for heating the mold to vulcanizing temperature, tubes secured along the said projecting ribs, and inlet and exist means connected to said tubes for circulation of a heat controlling fluid thru said tubes to vary the temperature applied to the grooves relative to the temperature of the remainder of the mold, said tubes being located toward the inner ends of said projections.

3. A mold for a pneumatic tire including two separable annular mold halves defining a toroidal cavity for the tire, said mold halves having recesses accommodating tread block assemblies for confining and shaping the tire tread, said tread block assemblies being comprised of projecting ribs and interposed spacer rings, the inner ends of said projecting ribs being provided with tubes, inlet and outlet means passing radially of the mold through said ribs to said tubes for circulation of a heat controlling fluid therein to vary the temperature of the projecting ribs with respect to the remainder of the mold.

4. A mold for a pneumatic tire including two separable annular mold halves defining a toroidal cavity for the tire, said mold halves having recesses accommodating tread block assemblies for confining and shaping the tire tread, said tread block assemblies being comprised of projecting ribs and interposed spacer rings, said spacer rings being made of material of high heat conductivity to maximize heat transfer from the mold to the tire tread, said projecting ribs bearing tubes, inlet and outlet means passing radially of the mold through said ribs to said tubes for circulation of a heat controlling fluid therein to vary the temperature of the projecting ribs with respect to the remainder of the mold, said tubes being located toward the inner ends of said projections.

5. In a mold for retreading a pneumatic tire having means for confining and shaping a strip of raw tire tread composition in engagement with a tire carcass, projecting ribs for impressing a grooved anti-skid pattern on the tread, and means for heating the raw tread composition to vulcanizing temperature, the improvement of tubes mounted on the inner portions of said projecting ribs for circulating a fluid medium to control the relative temperature applied to the grooves compared to the temperature applied to the remainder of the tread, said tubes being independent of said first mentioned heating means.

References Cited in the file of this patent

UNITED STATES PATENTS

| Number | Name | Date |
|---|---|---|
| 2,046,372 | Engstrom | July 7, 1936 |
| 2,297,017 | Overman | Sept. 29, 1942 |
| 2,370,972 | Kraft | Mar. 6, 1945 |

FOREIGN PATENTS

| Number | Country | Date |
|---|---|---|
| 13,406 of 1923 | Australia | July 14, 1924 |